United States Patent Office 3,839,472
Patented Oct. 1, 1974

---

3,839,472
PROCESS FOR THE PREPARATION OF 2,2,5,5-TETRAMETHYL-1,3,4,6-HEXANETETROL
Alfred G. Robinson and Hugh J. Hagemeyer, Jr., Longview, Tex., assignors to Eastman Kodak Company, Rochester, N.Y.
No Drawing. Continuation-in-part of application Ser. No. 45,218, June 10, 1970, now Patent No. 3,671,550. This application Aug. 27, 1971, Ser. No. 175,733
Int. Cl. C07c 29/00, 31/18
U.S. Cl. 260—635 E                 7 Claims

ABSTRACT OF THE DISCLOSURE 2,2,5,5-Tetramethyl-1,3,4,6-hexanetetrol is formed by reacting hexahydro - 3,3,6,6-tetramethylfuro[3,2-b]furan-2,5-diol with hydrogen in the presence of water and a Raney nickel hydrogenation catalyst at a temperature of from about 90° C. to about 135° C. and a pressure of from about 1000 p.s.i. to about 5000 p.s.i. The tetrol product is a polyol with numerous obvious uses. For example, esterification with mono-carboxylic acids will yield products useful as plasticizers, solvents and synthetic lubricants.

---

This application is a continuation-in-part of our copending application U.S. Ser. No. 45,218, filed June 10, 1970, now U.S. Pat. 3,671,550.

This invention relates to a new method of preparing 2,2,5,5-tetramethyl-1,3,4,6-hexanetetrol. More specifically, this invention relates to the preparation of 2,2,5,5-tetramethyl-1,3,4,6-hexanetetrol from hexahydro-3,3,6,6-tetramethylfuro[3,2-b]furan-2,5-diol.

The tetrol product, 2,2,5,5-tetramethyl-1,3,4,6-hexanetetrol, was previously described by Hugo Rosinger in 1907 (28 Monatsh, 947-960). However, his method of preparation was as follows:

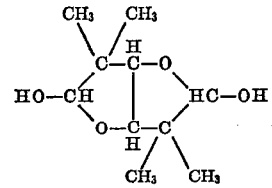

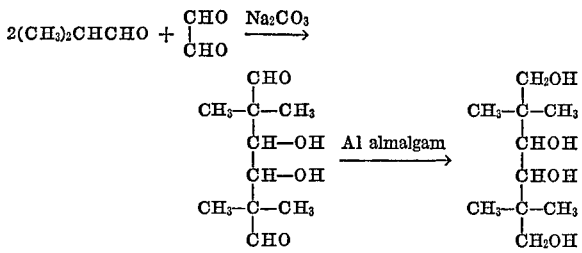

Subsequent work has shown that this process does not consistently produce 2,2,5,5 - tetramethyl - 1,3,4,6-hexanetetrol. Thus, it can readily be appreciated that the process of Rosinger does not represent a commercially attractive method of producing the tetrol. No other report of a method for preparing this tetrol is known. It is readily apparent that this compound is a polyol which will have numerous obvious uses if a commercially acceptable method for its preparation can be developed. For example, esterification with mono-carboxylic acids will yield products useful as plasticizers, solvents and synthetic lubricants. In addition, this polyol can be use alone or in combination with other polyols to form polyesters useful in alkyd resins or polyurethane coatings.

Therefore, an object of this invention is to provide a commercially acceptable process for producing 2,2,5,5-tetramethyl-1,3,4,6-hexanetetrol.

A further object of this invention is to provide a process whereby 2,2,5,5-tetramethyl-1,3,4,6-hexanetetrol is produced from hexahydro - 3,3,6,6 - tetramethylfuro[3,2 - b]furan-2,5-diol.

These and other objects will be apparent hereinafter.

The novel compound, hexahydro - 3,3,6,6 - tetramethylfuro[3,2-b]furan-2,5-diol (hereinafter referred to as the "bicyclic diol") used as a starting material for the process of the invention has the following structure:

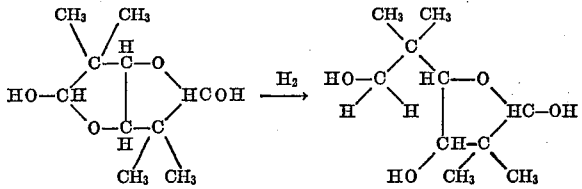

This novel compound and a method of its preparation is described in U.S. Patent Application Ser. No. 45,218, filed June 10, 1970, now U.S. Pat. 3,671,550, which is incorporated herein by reference.

It was quite unexpected that this bicyclic diol would undergo hydrogenolysis to yield the polyol 2,2,5,5-tetramethyl-1,3,4,6-hexanetetrol (hereinafter referred to as the tetrol) to the virtual exclusion of other competing possible rearrangements. This is particularly surprising in view of the numerous rearrangements which are theoretically possible. For example, it would be expected that reacting a cyclic compound like the bicyclic diol with hydrogen under the conditions of the invention would result in a broad mix of compounds. Typical of the reactions which could be expected are (a) incomplete reduction, such as the following:

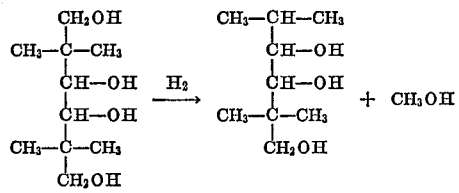

and (b) carbon chain cleavage of the product such as:

```
  CH₂OH              CH₃—CH—CH₃
CH₃—C—CH₃              CH—OH
  CH—OH    H₂         CH—OH
  CH—OH    ——→      CH₃—C—CH₃   + CH₃OH
CH₃—C—CH₃              CH₂OH
  CH₂OH
```

Using the process of the invention, neither of these type side reactions occurs to any appreciable extent.

In the novel process of our invention, the bicyclic diol is reacted with hydrogen in the presence of water and a Raney nickel catalyst. A preferred temperature range for the reaction is from about 90° C. to about 135° C. Product conversion and yield of the tetrol are in the range of 95%. At temperatures lower than 90° C. the reduction proceeds at an impractically slow rate and results in low product conversions. At temperatures exceeding about 135° C. carbon chain cleavage of the product begins to take place to yield methanol and low molecular weight polyols. This results in decreased yields.

A minimum hydrogen pressure of 1000 p.s.i. is necessary to achieve good conversions to the tetrol while the upper pressure is limited only by the capabilities of the reaction equipment. The preferred hydrogen pressure is about 3000 p.s.i. The mechanism of the reaction is not fully understood. Hydrogenation catalysts other than Raney nickel do not produce the same high product conversions and yield. Catalyst concentration is not critical and it has been found that from about 0.1% to about 10% by weight of the catalyst works effectively. In addition, water is necessary to achieve optimum yields. The amount of water present is not critical although a preferred ratio of diol to water has been found to be from about 4:1 to about 1:1 by weight. The effect of the water is unknown;

however, one hypothesis is that it serves to maintain an active catalyst surface.

The following examples are set forth for the purpose of illustration and it should be understood that they are not to be construed as limiting the invention in any manner.

Example 1

A mixture consisting of 101 grams (0.5 mole) of hexahydro-3,3,6,6-tetramethylfuro[3,2-b]furan - 2,5 - diol, 100 grams of water and 5 grams of Raney nickel is reduced in a stirred 300-ml. autoclave at 110° C. for four hours using 3000 p.s.i. hydrogen pressure. The catalyst is removed by filtration. Water is removed by heating the filtrate to 90° C. at a reduced pressure of 25 mm. The syrupy residue is chilled for two hours at about 5° C. and crystallized. The crude solid is recrystallized from 700 ml. of 85/15 ether/acetone to give 81 grams of 2,2,5,5-tetramethyl-1,3,4,6-hexanetetrol, a white solid, m.p. 88–89° C. Reworking the mother liquors gives an ultimate conversion and yield of tetrol of 94.7 percent.

Examples 2–7

In Examples 2–7, 2,2,5,5-tetramethyl-1,3,4,6-hexanetetrol is prepared by the method of Example 1 except for the variations indicated.

| Ex. | Temp. (° C.) | H₂ press. (p.s.i.) | Time (hr.) | Solvent | Catalyst | Product conversion (percent) |
|---|---|---|---|---|---|---|
| 2 | 85 | 3,000 | 8 | Water | Raney Ni | 42 |
| 3 | 145 | 3,000 | 4 | ...do... | ...do... | [1] 64 |
| 4 | 110 | 3,000 | 4 | ...do... | CuCrO₄ | 0 |
| 5 | 110 | 3,000 | 4 | Ethanol | CuCrO₄ | 10 |
| 6 | 110 | 3,000 | 4 | ...do... | Raney Ni | 35 |
| 7 | 110 | 500 | 4 | Water | ...do... | 51 |

[1] Substantial quantities of methanol and lower molecular weight polyol produced.

These examples illustrate the effect of temperatures outside of the preferred range (Examples 2 and 3), other catalysts (Examples 4 and 5), other solvents (Examples 5 and 6) and lower pressure (Example 7) upon the reaction.

The invention has been described in detail with particular reference to certain preferred embodiments thereof, but it will be understood that variations and modifications can be effected within the spirit and scope of the invention.

We claim:

1. A process for the preparation of 2,2,5,5-tetramethyl-1,3,4,6-hexanetetrol which comprises reacting hexahydro-3,3,6,6 - tetramethylfuro[3,2-b]furan-2,5-diol with hydrogen in the presence of a catalytic amount of a Raney nickel hydrogenation catalyst and water at a temperature of from about 90° C. to about 135° C. and a hydrogen pressure of at least 1000 p.s.i.

2. The process of Claim 1 wherein the hydrogen pressure is from about 1000 p.s.i. to about 5000 p.s.i.

3. The process of Claim 1 wherein the hydrogen pressure is about 3000 p.s.i.

4. The process of Claim 1 wherein the reaction is conducted at a temperature of from about 100° C. to about 120° C.

5. The process of Claim 1 wherein the reaction is conducted at about 110° C.

6. The process of Claim 1 wherein from about 0.1% to about 10% of catalyst is used.

7. The process of Claim 1 wherein the ratio of diol to water is from about 4:1 to about 1:1.

References Cited

UNITED STATES PATENTS

| | | | |
|---|---|---|---|
| 3,671,550 | 6/1972 | Hagemeyer et al. | 260—635 E |
| 2,546,019 | 3/1951 | Smith | 260—635 E |
| 2,497,812 | 2/1950 | Copelin | 260—635 E |
| 2,097,493 | 11/1937 | Leuck et al. | 260—635 E |
| 3,168,534 | 2/1965 | Payne | 260—635 E |
| 2,700,685 | 1/1955 | Cooper et al. | 260—635 E |
| 3,028,431 | 4/1962 | Webb | 260—635 E |

HOWARD T. MARS, Primary Examiner

U.S. Cl. X.R.

252—56 R, 364; 260—78.4 E, 484 R, 488 J, 635 R